United States Patent [19]
Cho et al.

[11] 3,729,632
[45] Apr. 24, 1973

[54] PENETRATING RADIATION GAUGE

[75] Inventors: Boong Y. Cho, Columbus; Robert J. Pfeifer, Worthington; Orval L. Utt, Columbus; all of Ohio.

[73] Assignee: Industrial Nucleonics Corporation, Columbus, Ohio

[22] Filed: Dec. 21, 1970

[21] Appl. No.: 100,331

[52] U.S. Cl. ............................250/83.3 D, 250/83 C
[51] Int. Cl. ............................................G01n 23/02
[58] Field of Search...250/83.3 D, 83 C, 214, 71.5 R, 250/106 SC; 324/123

[56] References Cited

UNITED STATES PATENTS

| | | | |
|---|---|---|---|
| 2,829,268 | 4/1958 | Chope | 250/83.3 D |
| 2,549,402 | 4/1951 | Vossborg, Jr. | 250/83 C |
| 3,529,162 | 9/1970 | Troutman | 250/83.3 D |

*Primary Examiner*—Archie R. Borchelt
*Attorney*—Lowe and King, William T. Fryer, III and C. Henry Peterson

[57] ABSTRACT

A penetrating radiation gauge includes a pulsed x-ray source for determining wall thickness of articles moving past the source. The gauge is continuously standardized by respectively placing in the source radiation field first and second different standard samples between first and second different pairs of adjacent articles. A detector responds to the levels of radiation absorbed by articles while thickness is being measured and by the samples while standardization is being performed to derive an output signal exponentially related to the radiation absorption properties of the articles and samples. A linearizing network responsive to the detector converts the exponential relationship into a straight line function whereby a linear relationship between the magnitude of the detector output signal and the absorption property is derived. While the linearizing network is deriving a signal indicative of the radiation absorption properties of the first sample, the straight line relationship is adjusted so that the gauge response is a point on the line having a predetermined output signal corresponding with the absorption properties of the first sample. While the linearizing network is deriving a signal indicative of the absorption properties of the second sample, the slope of the line is adjusted so that the gauge derives an output signal having a predetermined magnitude corresponding with the absorption properties of the second sample.

21 Claims, 4 Drawing Figures

Patented April 24, 1973

INVENTORS,
BOONG Y. CHO
ROBERT J. PFEIFER
ORVAL L. UTT

BY

Lowe & King
ATTORNEYS

Patented April 24, 1973 3,729,632

INVENTORS,
BOONG Y. CHO
ROBERT J. PFEIFER
ORVAL L. UTT

BY

*Lowe & King*
ATTORNEYS

PENETRATING RADIATION GAUGE

The present invention relates generally to penetrating radiation gauges and, more particularly, to a new and improved system for and method of standardizing a penetrating radiation gauge.

The uses of penetrating radiation gauges for determining properties such as thickness or density of a material are well known. The output of these gauges sometimes has a tendency to change, due to source variations, detector drift or build up of foreign material in the measuring path. In certain applications, these variations in output can be on approximately the same order of magnitude as the change in gauge output signal for the measured property. To rectify this problem, many prior art gauges employ standardizing techniques whereby the gauge output is periodically established to standard values. Operations involved in the prior art device are usually relatively time consuming because standardization is actually performed in an iterative manner, such as by pulling a gauge off sheet for source and zero standardization. The source standardization provides adjustment for proportional changes, such as due to source intensity variations, and the input amplifier is zeroed. The sensitivity of a gauge can change too, i.e. slope of the output response and needs standardization.

In accordance with one aspect of the present invention, standardization is performed after converting the exponential relationship between radiation absorption properties and detector output thickness into a linear function wherein absorption properties are directly proportional to signal magnitude, i.e., signal magnitude is linearly related to material absorption properties. The output signal of such a network is thereby characterized as a straight line when plotted in a Cartesian coordinate system.

A standardizing circuit responds to the output of the linearizing network to adjust a point on the line and the slope of the line. The point on the line is adjusted so that the output signal of the standardizing network has a predetermined value while a first standard sample is in the gauge radiation field. This is accomplished by adjusting the magnitude of an offset voltage fed to the standardizing network. The slope of the straight line, and therefore the sensitivity of the gauge, is controlled by adjusting a gain factor of the standardizing network so that the output of the standardizing network is a predetermined magnitude while a second standard sample, having differing radiation absorption properties from the first sample, is in the gauge radiation field. This procedure considerably reduces the number of iterative steps required to standardize and thereby generally provides faster standardization times than prior art systems.

In one particular use of the invention, it is adapted to inspect an absorption property of spaced articles moving relative to the gauge. In one system, the articles are bottles carried by a conveyor past a penetrating radiation source of the pulsed x-ray type. The source is pulsed each time a different bottle is in the source field of view so that the detector derives an output indicative of the thickness of each bottle. To enable the maximum number of bottles to be gauged while standardizing very frequently, the first standard sample is placed in the gauge field of view in the space between a first pair of adjacent bottles, while the second sample is placed in the source field of view in the space between a second pair of adjacent bottles. By inserting the first and second samples between different pairs of adjacent bottles, the number of bottles on the line can be maximized. Thereby the number of bottles inspected during any length of time is maximized, while providing very frequent standardization.

It is, accordingly, an object of the present invention to provide a new and improved system for and method of standardizing a penetrating radiation gauge.

Another object of the present invention is to provide a new and improved system for and method of standardizing a penetrating radiation gauge wherein the number of iterative steps required is materially reduced to decrease the time required for standardization.

A further object of the invention is to provide a new and improved system for and method of standardizing a penetrating radiation gauge by inserting a pair of standard samples having differing absorption properties in the gauge radiation field.

A further object of the invention is to provide a new and improved system for and method of continuously standardizing a penetrating radiation gauge with a pair of standard samples having differing properties which are inserted between discrete articles being monitored in such a manner as to enable the maximum number of articles to be gauged.

The above and still further objects, features and advantages of the present invention will become apparent upon consideration of the following detailed description of one specific embodiment thereof, especially when taken in conjunction with the accompanying drawings, wherein.

Figure 1:
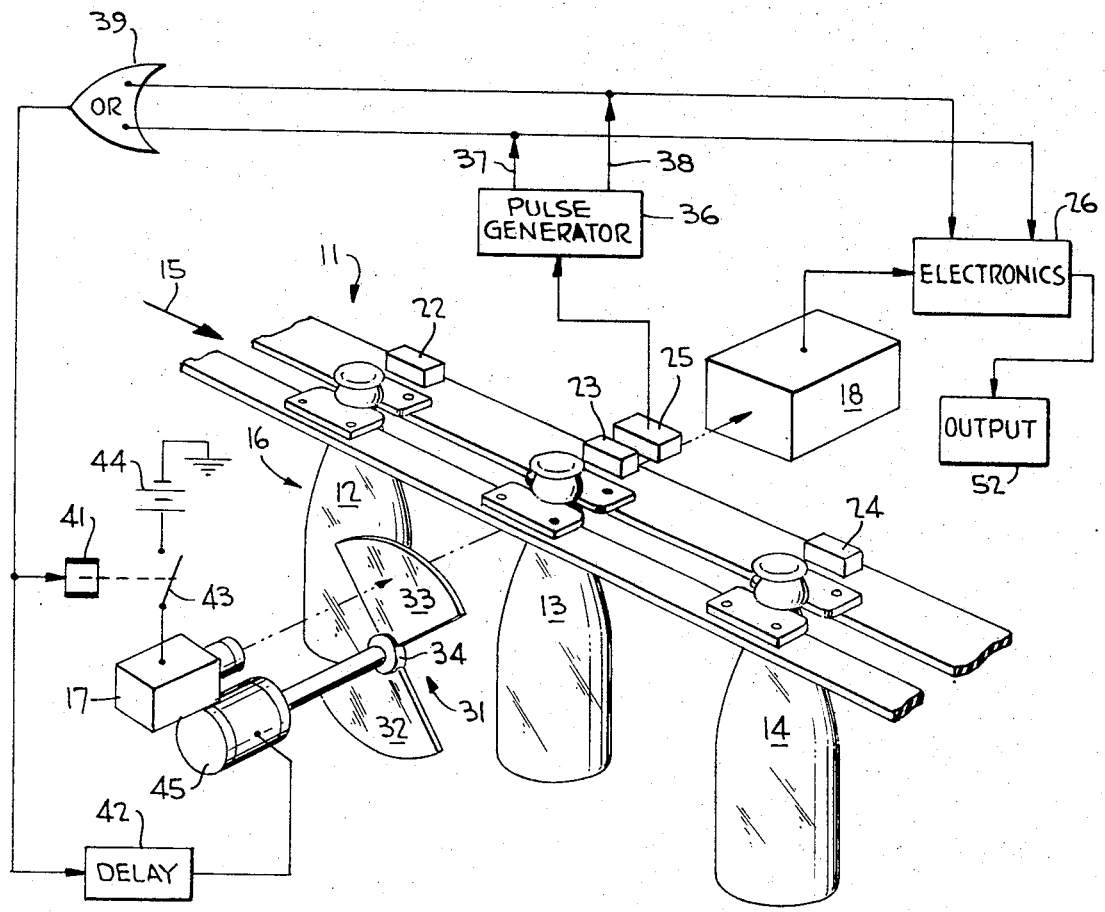
FIG. 1 is a schematic perspective view of one embodiment in accordance with the present invention.

Reference is now made to FIG. 1 of the drawings wherein there is illustrated a chain conveyor 11 carrying spaced articles, such as glass bottles 12, 13 and 14, which move on the conveyor in the direction indicated by arrow 15. A fixed station 16 with a gauge for monitoring the wall thickness of bottles on the chain conveyor 11 is provided. Station 16 includes a pulsed x-ray source 17 positioned on one side of conveyor 11 and an x-ray detector 18, including a scintillator and a photomultiplier tube (not shown), positioned on the opposite side of conveyor 11 from x-ray source 17. Each time a bottle on chain conveyor 11 passes station 16 x-ray source 17 is pulsed to produce a short duration x-ray beam for monitoring the wall thickness of the bottles on the conveyor. The x-ray pulse derived by source 17 has a relatively narrow beam width so that there is a minimum of scattering from the bottles, producing relatively low noise level signals from photomultiplier x-ray detector 18. The use of an x-ray source for monitoring bottle thickness is advantageous because of the relatively high speed with which the bottles move on conveyor 11, approximately 1,000 bottles per minute move past station 16, whereby fast response time photomultiplier detectors can be used. In addition, the single wall bottle thicknesses of between 30 and 70 mils can be monitored in a most accurate manner by means of x-ray radiation.

To control pulse activation of x-ray source 17 each time a bottle on conveyor chain 11 passes through station 16, chain 11 carries a multiplicity of iron slugs, such as slugs 22–24 which are placed on the chain at the same longitudinal position as bottles 12–14, respectively. Iron slugs 22–24 and chain 11 are positioned relative to x-ray source 17 in such a manner that the source beam does not intercept them. In longitudinal alignment with station 16 is iron detector 25 which derives a triggering pulse each time one of the iron slugs approaches it and derives a further triggering pulse in response to one of the iron slugs receding from it. The polarities of triggering pulses derived by iron detector 25 are opposite for the approaching and receding conditions, and are assumed in the present instance to be positive in response to iron slugs approaching the iron detector and negative in response to iron slugs going away from the iron detector. By generating pulses in response to each iron slug approaching and receding from station 16, it is possible separately to trigger x-ray source 17 each time one of the bottles is in the source field of view and in the space between adjacent pairs of bottles.

In accordance with one aspect of the present invention, the pulses generated to indicate a space between pairs of adjacent ones of the bottles are employed for standardizing electronics network 26, which is responsive to the output of x-ray detector 18. The gauge is standardized using electronics network 26. For example, the gauge is standardized for x-ray source changes in energy and intensity, foreign material in the measuring path, and detector drift, to provide the original output calibration. Standardization for gauge sensitivity is required because of variations in x-ray source energy. Standardization is also required for proportional changes due to x-ray source intensity or detector variations, or foreign material in the path.

With an x-ray source monitoring a high speed process, such as bottles moving along conveyor chain 11, it is desirable to standardize the gauge frequently, while enabling the maximum number of bottles to be processed and monitored for wall thickness. To this end, the gauge at station 16 is very frequently standardizing by inserting first and second standard samples having differing x-ray absorption properties in the path of x-ray source 17. The first and second standard samples are placed in the pulsed x-ray beam field of view in the space between first and second different pairs of adjacent ones of the article, e.g., one standard sample is placed between a first pair of bottles, such as bottles 12 and 13, and the second standard sample is placed between a second pair of bottles, such as bottles 13 and 14.

Insertion of different first and second standard samples in the space between different pairs of adjacent bottles is performed by shutter 31 that includes two oppositely directed blades 32 and 33, each having an angular extent of 90°. Between blades 32 and 33 shutter 31 includes a pair of x-ray transparent segments, each also having a 90° extent. Blades 32 and 33 are rotatable about axis 34 to selectively insert differing amounts of radiation absorption material in the field of view of pulses derived from source 17. Blades 32 and 33 are fabricated in such a manner as to simulate two different wall thicknesses of bottles on conveyor 11. In a typical example blade 32 has absorption properties to simulate a bottle having a single wall thickness of 40 mils, while blade 33 absorbs an amount of x-rays equal to a bottle having a single wall thickness of 60 mils. Blade 33 is rotated so that it is in the x-ray source 17 beam while the space between a first pair of bottles, such as bottles 13 and 14, is moving past station 16, while blade 32 is in the source field of view while a space between a second pair of bottles, such as bottles 12 and 13, is passing station 16. Shutter 31 is driven so that the transparent segments thereof are in the x-ray source field of view while bottles 12–14 are in the x-ray source field of view.

X-ray source 17 is activated and shutter 31 is rotated in a synchronous manner to achieve the aforestated results by connecting the output of iron slug detector 25 to pulse generator 36. In response to the positive and negative pulses derived from iron detector 25, pulse generator 36 derives pulses of standard amplitude and width on leads 37 and 38, respectively. A pulse on lead 37 signals that x-ray source 17 is to be activated while a transparent segment of shutter 31 is in the source field of view so that a measurement of wall thickness of one of bottles 12–14 is to be made. A pulse on lead 38 indicates that source 17 is to be activated while one of standardizing blades 32 or 33 is in the X-ray source field of view.

The pulses on leads 37 and 38 are applied to electronics network 26 to control circuitry therein, as described *infra*. The pulses on leads 37 and 38 are also combined in OR gate 39, having an output which drives relay coil 41 and delay network 42 in parallel. In response to each pulse derived from pulse generator 36, whether on lead 37 or lead 38, OR gate 39 activates coil 41 to close contacts 43 momentarily to supply the voltage of d.c. source 44 to x-ray source 17. In response to the momentary closure of contacts 43 and the resulting momentary application of d.c. source 44 to x-ray source 17, a pulsed x-ray beam is derived from x-ray source 17 to enable measurements of wall thicknesses of bottles 12–14 and standardizing operations to be performed. After x-ray source 17 has been activated and the pulsed beam has terminated, delay 42 supplies a pulse to step motor 45 to drive shutter 31 about axis 34 in 90° steps.

Figure 3:
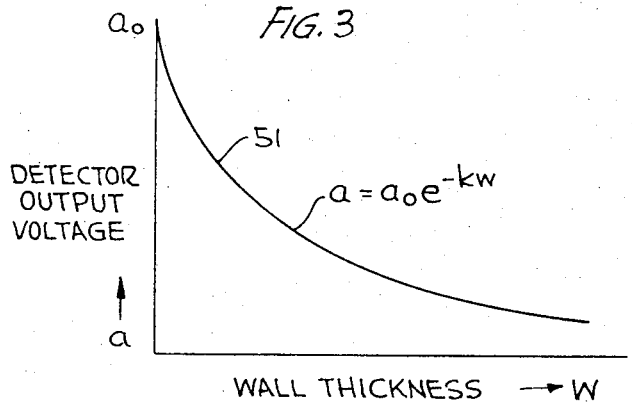
FIG. 3 is an illustration of a curve indicating wall thickness versus photomultiplier tube output voltage in the electronics network of FIG. 2.

While one of the bottles on conveyor 11 is passing through station 16, x-ray source 17 derives a pulse, the energy of which is absorbed by an amount indicative of the amount of material in the bottle passing station 16, and therefore indicative of the thickness of the wall of the bottle passing the station. The amount of radiation passing through the bottle is detected by detector 18 which supplies a signal to electronics network 26. The relationship between the amplitude of the pulse derived by detector 18 and the wall thickness of the bottle being monitored or inspected is an exponential curve, and generally follows the curve 51, FIG. 3. From FIG. 3, it is noted that the amplitude of the detector 18 output voltage decreases for increasing wall thickness, as given by:

$$\alpha = \alpha_o e^{-kw}$$

where:

$\alpha$ = the output voltage amplitude of detector 18, $\alpha_o$ = a constant indicative of the output voltage of detector 18 while no material is between x-ray source 17 and detector 18, $e$ = the base of natural logrithms, $k$ = a proportionality constant indicative of the density and chemical composition of material in the x-ray beam, and $w$ = the thickness of the walls between source 17 and photomultiplier tube 18.

The sensitivity of the gauge is determined by the term $k$ and is subject to change as indicated *supra*.

The output voltage response of detector 18 is converted into a signal directly proportional to the thickness of a single wall of a monitored bottle by electronics network 26 and the gauge output pulses of pulse generator 36 on line 38 initiate the positioning of standard samples 32 and 33 in the field of view of pulsed x-ray source 17. The output signal of electronics network 26 is fed to output network 52 which derives a signal to indicate wall thickness of each bottle passing station 16 on conveyor 11. Output network 52 can be a digital computer including the usual arithmetic unit, memory and indicators. The computer preferably includes memory space for the wall thickness of each bottle and includes means for indicating which of the bottles have wall thicknesses outside a desired range.

Figure 2:
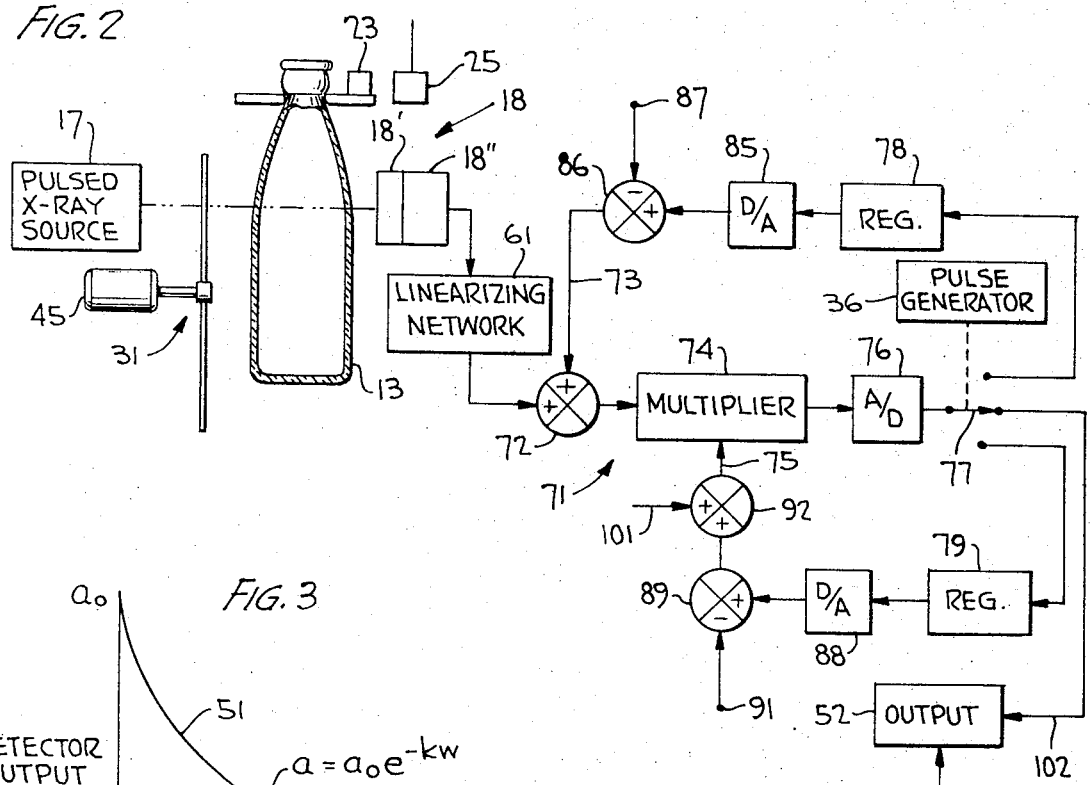
FIG. 2 is a block diagram of a preferred embodiment of the electronics network included in FIG. 1.

Reference is now made to FIG. 2 of the drawings wherein there is disclosed the elements included within electronics network 26, as well as a schematic showing of bottle 13, pulsed x-ray source 17, scintillator 18', and photomultiplier 18''. The output signal of photomultiplier 18'' is an analog signal exponentially related to the thickness of a bottle or standard sample in pulsed x-ray source 17 field of view, and is fed to linearizing network 61. Linearizing network 61 can be any well known circuit for converting the exponential relationship indicated in FIG. 3 to a linear, straight line relationship such as indicated by curves 62, 63 or 64 in FIG. 4, representative of the output of multiplier 74.

Preferably, the output voltage of multiplier 74 represents wall thickness by the straight line 62 which by means hereinafter described intersects the origin of a Cartesian coordinate system. The straight line transfer characteristic of linear network 61 also has a predetermined slope, which determines the gauge sensitivity. If, however, system sensitivity changes the characteristic output curve of linearizing network 61 changes so that the curve has a slope as indicated, for example, by straight line 63. If the gauge drifts, curve 62 is translated from the origin of the Cartesian coordinate system illustrated in FIG. 4 and intersects the horizontal (x-axis) at some other point than the origin, such as point 65. Therefore, the output voltage of linearizing network 61 has a tendency to vary from the origin of the coordinate system of FIG. 4 and to have a different slope from that indicated by line 62; in a typical instance the actual output characteristic of linearizing network 61 is represented by line 63.

In accordance with one aspect of the present invention, the system is standardized so that the linear output characteristic of network 61, such as is illustrated by curve 63, is translated and rotated so that the gauge characteristic coincides with curve 62. To these ends, offset and slope changes are introduced into the transfer characteristic of linearizing network 61 by standardizing network 71 in response to signals derived from x-ray detector 18 while standard samples 32 and 33, respectively, are in the field of view of x-ray source 17.

Figure 4:
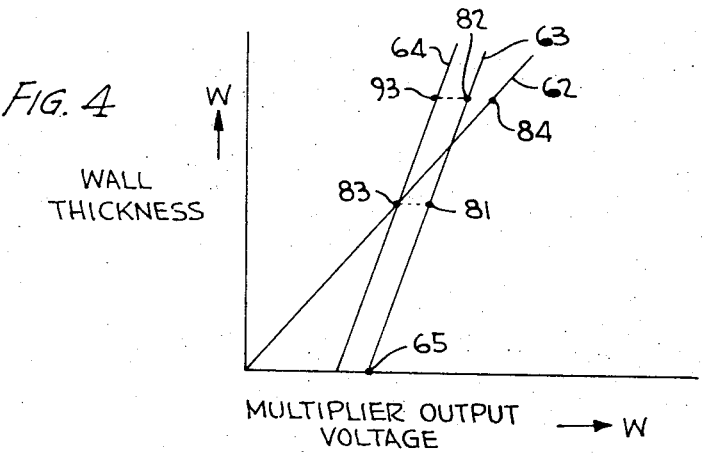
FIG. 4 is a curve illustrating the straight line relationships of output voltages in the gauge included in FIG. 2.

Standardizing network 71 includes a summing node 72 having a first input responsive to the output of linearizing network 61 and a second input, on lead 73, indicative of the amount of offset required to restore the transfer characteristic of linearizing network 61 to the origin of the coordinate system illustrated in FIG. 4. The output signal of summing node 72 is applied to one input of d.c. analog multiplier 74, the other input of which, on lead 75, is indicative of the change in slope required for the transfer characteristic of linearizing network 61 to achieve a slope commensurate with line 62.

The analog output signal of multiplier 74 is applied to analog to digital converter 76 that derives a digital output signal compatible with digital computer circuitry included in output network 52, to which it is connected via switch 77. Switch 77 is controlled by pulses derived on leads 37 and 38, which indicate that the system is in a measuring or standardizing mode. Each time a measuring mode indicating pulse is derived on lead 37, switch 77 is activated to connect the output of analog to digital converter 76 to output network 52. Switch 77 is responsive to pulses derived on lead 38 to alternately connect the output of analog to digital converter 76 to registers 78 and 79. While switch 77 connects the output of converter 76 to register 78, x-ray source 17 is activated and blade 32 is in the source field of view, whereby register 78 is supplied with a signal directly proportional to, i.e., linearly related to, the wall thickness simulated by blade 32 as detected by photomultiplier 18. Register 78 stores this quantity, either on a long or short term basis, until another signal is applied thereto through switch 77 from converter 76. Similarly, converter 76 is connected to register 79 through switch 77 while blade 33 is being exposed to a beam from x-ray source 17. Register 79 stores this signal until another signal is applied thereto by converter 76. By employing a digital system for indicating and storing the outputs of multiplier 74, increased accuracy and the ability to store data for long time periods in the event of a system malfunction are provided.

The signals stored in registers 78 and 79 represent points on curve 63 corresponding with standard sample wall thicknesses of 40 and 60 mils, as indicated by points 81 and 82, respectively, FIG. 4. Points 81 and 82, however, are desirably located on straight line 62 at points 83 and 84, respectively. Points 83 and 84 correspond with the desired, standardized output voltages of the gauge for wall thicknesses of 40 and 60 mils, respectively when the gauge has the desired sensitivity and offset.

To effect translation of point 81 to point 83, the output signal of register 78 is applied to digital to analog converter 85 which derives a d.c. output signal that is fed to difference node 86. A second input to difference node 86 is derived from a constant d.c. source, connected to terminal 87, having an amplitude directly proportional to the gauge desired output signal for bottle wall thickness of 40 mils, as represented by point 83 on straight line 62. The signal on lead 73 is applied to summing node 72 with a polarity to shift curve 63 to curve 64, so that point 81 coincides with point 83, whereby a feedback network is completed to control gauge offset. Curve 64 is a straight line having a slope identical to the slope of line 63 and an intersection point with line 62 for a wall thickness value equal to the simulated wall thickness of the standard sample of blade 32.

After curve 63 has been translated to the position indicated by straight line 64, it must be rotated so that the slope thereof corresponds with the slope of line 62. This is accomplished by adjusting the gain of the gauge by varying the input to multiplier 74 on lead 75. To these ends, the output signal of register 79 is applied to digital to analog converter 88, which derives a d.c. output signal directly proportional to the contents of register 79. The output signal of converter 88 is fed to one input of difference node 89, having a second input derived from a source connected to terminal 91, which is a d.c. voltage directly proportional to the desired gauge output signal for a 60 mil bottle thickness. The output signal of difference node 89 is therefore a d.c. voltage magnitude directly proportional to the difference between the radiation level derived from photomultiplier 18″ while the standard sample of blade 33 is in the path of x-ray source 17 and the desired output voltage of the gauge for a 60 mil wall thickness, as indicated by the separation between points 93 and 84, FIG. 4.

The output voltage of difference node 89 is supplied to multiplier 74 through a second feedback network to control the gain, and therefore sensitivity, of the gauge so that it corresponds with the slope of line 62. Prior to being applied to multiplier 74, however, the output voltage of difference node 89 must be modified by a voltage corresponding with a wall thickness of 60 mils. If the output voltage of difference network 89 is not so modified, instability problems are possible because a zero output voltage of the difference node indicates that system sensitivity has been achieved, but results in a zero output of multiplier 74. Therefore, a separate DC reference voltage at terminal 101 is added to the output voltage of node 89 in summing node 92, which derives an output signal on lead 75 that feeds multiplier 74. In response to the difference output of node 89, the input to multiplier 74 is represented by point 93 on straight line 64. The input to multiplier 74 represented by point 93 lowers the gauge gain and changes the slope of the gauge gain from line 64 to line 62 to achieve the desired result.

Between operations associated with supplying offset and gain control signals to leads 73 and 75 the system is activated so that the wall thickness of a bottle on conveyor 11 is monitored and supplied to input 102 of output system 52. After the gauge sensitivity has been standardized, the wall thickness of another bottle is monitored and supplied to output system 52. Output 52 has a digital input 103 corresponding to a given thickness and digitally adds to it the input on line 102 to produce an indication of thickness over a desired range. Thereafter, offset standardization is performed. Operation continues continuously in this manner so that the gauge is very frequently standardized. Because standardization is performed between first and second different pairs of adjacent ones of the bottles, the number of bottles inspected is maximized while still providing continuous standardization.

While there has been described and illustrated one specific embodiment of the invention, it will be clear that variations in the details of the embodiment specifically illustrated and described may be made without departing from the true spirit and scope of the invention as defined in the appended claims.

We claim:

1. A method of standardizing a gauge used for monitoring a property of spaced articles moving relative to a gauging station, said gauge including a penetrating radiation source and a detector responsive to the source, said source deriving said radiation each time a different article is in the source field of view so that the detector derives an output indicative of said property of each article exposed to the source, first and second characteristics of said gauge being susceptible to changes, comprising the steps of repeatedly placing first and second standard samples having differing radiation absorption properties in the source field of view in the space between first and second different pairs of adjacent ones of said articles, detecting the radiation absorption level by the first and second samples when they are in the source field of view, and adjusting first and second properties of the gauge related to said first and second characteristics in response to the detected radiation absorption by the first and second samples.

2. The method of claim 1 wherein the radiation source is of the pulsed type and further including the steps of activating the pulsed source only while one of the articles or one of the standard samples is in the source field of view.

3. A system for standardizing a gauge used for monitoring a property of spaced articles moving relative to a gauging station, said gauge including a penetrating radiation source and a detector responsive to the source, said source deriving said radiation each time a different article is in the source field of view so that the detector derives an output indicative of said property of each article exposed to the source, first and second characteristics of said gauge being susceptible to changes, comprising first and second standard samples having different radiation absorption properties, means for repeatedly inserting said first and second samples in the source field of view in the space between first and second different pairs of adjacent ones of said articles, means responsive to the detector for deriving first and second signals indicative of the radiation absorption level by the first and second samples when they are in the source field of view, and means responsive to said first and second signals for adjusting first and second properties of the gauge respectively related to said first and second characteristics in response to the detected radiation absorption by the first and second samples.

4. A method of standardizing a gauge used for monitoring a property of a material, said gauge including a penetrating radiation source and detector means responsive to radiation from said source, said detector means deriving an output indicative of the property in response to the level of said radiation absorbed by the material, said gauge being susceptible to changes in a pair of parameters, comprising the steps of exposing first and second standard samples having differing radiation absorption properties to the source, detecting with the detector means the radiation absorption level by the first and second articles to derive a first signal having magnitudes exponentially related to the absorption properties of the samples, linearizing said first signal to derive a second signal having magnitudes linearly related to the absorption properties of said samples, operating on said second signal so that a straight line curve representing the second signal magnitude as a function of the value of the property intersects a predetermined point of signal magnitude versus property value and has a predetermined slope, said operation being performed by adjusting the value of the second signal to a predetermined magnitude while the second signal indicative of the absorption properties of the first sample is derived and by adjusting the slope of the straight line so that it has the predetermined slope while the second signal indicative of the absorption properties of the second sample is derived.

5. The method of claim 4 wherein the point on the line and the slope of the line are adjusted so that the line is positioned to enable the gauge to derive a zero output level for an article having zero radiation absorption properties.

6. A gauge used for monitoring a property of a material comprising a penetrating radiation source, detector means responsive to radiation from said source, said detector means deriving an output indicative of the property in response to the level of said radiation absorbed by the material, said detector means including means for deriving a first signal having magnitudes exponentially related to said property, means responsive to the detector means for linearizing the first signal to derive a second signal characterized by magnitude variations linearly related to values of said property, said magnitude variations versus property values being represented by a straight line having a tendency to be translated and a slope susceptible to change in response to changes in characteristics of the gauge, standardizing means responsive to the linearizing means for controlling a point on the line and the slope of the line, said point on the line being controlled in response to the linearizing means deriving a signal indicative of the radiation absorption properties of a first standard sample on the radiation of the source, said slope being controlled in response to the linearizing means deriving a signal indicative of the radiation absorption properties of a second standard sample on the radiation of the source, and means responsive to the standardizing means for deriving an output signal indicative of the property of the material.

7. The gauge of claim 6 wherein the standardizing means includes feedback means responsive to a pair of reference levels and the output signal for deriving first and second feedback signals respectively indicative of the differences between reference values for the gauge response for the first and second samples and the actual gauge response for the first and second samples, means for controlling offset introduced by the standardizing means in response to the first feedback signal and means for controlling the gain of the standardizing means in response to the second feedback signal.

8. The gauge of claim 7 wherein the feedback means includes analog-digital converter means, and means for storing digital signals derived by said converter means.

9. The gauge of claim 6 wherein the material comprises a plurality of spaced articles moving relative to the gauge, means for deriving third and fourth signals in response to articles and spaces between the articles respectively passing the gauge, means responsive to the third signal for controlling the gauge so that the gauge derives the output signal to indicate absorption properties of the articles, and means responsive to the fourth signal for controlling a point on the line and the slope of the line.

10. The gauge of claim 9 further including means for repeatedly inserting the first and second standard samples between first and second pairs of adjacent ones of the articles.

11. A system for standardizing a gauge used for monitoring a property of spaced articles moving on a conveyor past a fixed gauging station, said gauge including a penetrating radiation source and a detector responsive to the source, said source deriving said radiation each time a different article is in the source field of view so that the detector derives an output indicative of said property of each article exposed to the source, first and second characteristics of said gauge being susceptible to changes, comprising first and second standard samples having different radiation absorption properties to simulate fixed, finite non-zero values of the property, means synchronized with the movement of the articles on the conveyor for respectively and repeatedly inserting said first and second samples in the source field of view in the space between first and second different pairs of adjacent ones of said articles, means responsive to the detector for deriving first and second signals indicative of the radiation absorption level by the first and second samples when they are in the source field of view, and means responsive to said first and second signals for adjusting first and second properties of the gauge respectively related to said first and second characteristics in response to the detected radiation absorption by the first and second samples.

12. The system of claim 11 further including a motor synchronized by movement of the conveyor line, said motor having a rotating shaft for carrying blades comprising said first and second samples; said blades being spaced from each other by regions transparent to said radiation so that the transparent regions are in the field of view while the articles are exposed to the source.

13. The system of claim 12 wherein the radiation source is a pulsed source, and means synchronized with movement of the conveyor for pulsing the source when the articles and samples are in the field of view.

14. The system of claim 11 wherein the radiation source is a pulsed source, and means synchronized with movement of the conveyor for pulsing the source when the articles and samples are in the field of view.

15. A system for monitoring the thickness of spaced articles moving on a conveyor line comprising:
  a gauging station fixed relative to the moving articles on the line, said gauging station including:
    i. a pulsed source of penetrating radiation,
    ii. a detector for the radiation, said detector deriving an output signal amplitude inversely and non-linearly related to the article thickness, said amplitude changing in response to changes of first and second characteristics of the gauge;

means synchronized with movement of the articles for pulsing the radiation source when articles are in the field of view of the source;

signal processing means for deriving a thickness indicating output signal in response to the detector signal amplitude derived in response to the source being pulsed;

means for standardizing the gauge so that the thickness indicating signal is independent of the changes of the first and second characteristics, said standardizing means including:
 i. first and second standard samples having different absorption characteristics for said radiation to simulate two different article thicknesses,
 ii. means synchronized with movement of the line for repeatedly inserting the first sample between first pairs of adjacent articles and for repeatedly inserting the second sample between second pairs of adjacent articles,
 iii. means synchronized with the insertion means for pulsing the source when the standard samples are in the field of view;

said signal processing means including:
 i. means for converting the signal amplitude non-linearly related to article thickness into another signal linearly related to article thickness, said another signal increasing in amplitude as thickness increases,
 ii. multiplier means having a first input responsive to an indication of the another signal,
 iii. means for comparing the article thickness indicating output signal when one of the standards is in the field of view with a first reference signal to derive a second input to the multiplier, said second input being supplied to the multiplier while the articles and the samples are in the field of view and being susceptible to change only when one standard is in the field of view,
 iv. signal offset means cascaded with said multiplier means,
 v. means for controlling the offset of said offset means, said controlling means including means for comparing the article thickness indicating output signal when the other standard is in the field of view with a second reference signal, said offset being derived while the articles and the samples are in the field of view and being susceptible to change only when said other sample is in the field of view.

16. The system of claim 15 wherein the article thickness generally varies over a predetermined range, and said simulated article thicknesses are within the range.

17. The system of claim 15 further including output means, and means for feeding the thickness indicating signals derived in response to the source being pulsed while the articles are in the field of view to the output means.

18. A system for monitoring the thickness of spaced articles moving on a conveyor line comprising:
a gauging station fixed relative to the moving articles on the line, said gauging station including:
 i. a pulsed source of penetrating radiation,
 ii. a detector for the radiation, said detector deriving an output signal amplitude inversely and non-linearly related to the article thickness, said amplitude changing in response to changes of first and second characteristics of the gauge;

means synchronized with movement of the articles for pulsing the radiation source when articles are in the field of view of the source;

signal processing means for deriving a thickness indicating output signal in response to the detector signal amplitude derived in response to the source being pulsed;

means for standardizing the gauge so that the thickness indicating signal is independent of the changes of the first and second characteristics, said standardizing means including:
 i. first and second standard samples having different absorption characteristics for said radiation to simulate two different article thicknesses,
 ii. means synchronized with movement of the line for repeatedly inserting the first sample between first pairs of adjacent articles and for repeatedly inserting the second sample between second pairs of adjacent articles,
 iii. means synchronized with the insertion means for pulsing the source when the standard samples are in the field of view;

said signal processing means including:
 i. means for comparing the article thickness indicating output signal when one of the standards is in the field of view with a first reference signal to derive first control signal for the processing means, said first control signal being supplied to the processing means while the articles and the samples are in the field of view and being susceptible to change only when said one standard is in the field of view, and
 ii. means for comparing the article thickness indicating output signal when the other standard is in the field of view with a second reference signal to derive a second control for the processing means, said second control signal being derived while the articles and the samples are in the field of view and being susceptible to change only when said other sample is in the field of view.

19. The system of claim 18 wherein the article thickness generally varies over a predetermined range, and said simulated article thicknesses are within the range.

20. A system for monitoring the thickness of spaced articles moving on a conveyor line comprising:
a gauging station fixed relative to the moving articles on the line, said gauging station including:
 i. a pulsed source of penetrating radiation,
 ii. a detector for the radiation, said detector deriving an output signal amplitude inversely and non-linearly related to the article thickness, said amplitude changing in response to changes of first and second characteristic of the gauge;

means synchronized with movement of the articles for pulsing the radiation source when articles are in the field of view of the source;

signal processing means for deriving a thickness indicating output signal in response to the detector signal amplitude derived in response to the source being pulsed;

means for standardizing the gauge so that the thickness indicating signal is independent of the changes of the first and second characteristics, said standardizing means including:
  i. first and second standard samples having different absorption characteristics for said radiation to simulate two different article thicknesses,
  ii. means synchronized with movement of the line for repeatedly inserting the first sample between first pairs of adjacent articles and for repeatedly inserting the second sample between second pairs of adjacent articles,
  iii. means synchronized with the insertion means for pulsing the source when the standard samples are in the field of view;
said signal processing means including:
  i. means responsive to the article indicating output signal when one of the standards is in the field of view to derive a first control signal for the processing means, said first control signal being supplied to the processing means to control the first characteristic while the articles and the samples are in the field of view and being susceptible to change only when one standard is in the field of view, and
  ii. means responsive to the article thickness output signal when the other standard is in the field of view to derive a second control signal for the processing means, said second control signal being supplied to the processing means to control the second characteristic while the articles and the samples are in the field of view and being susceptible to change only when said other sample is in the field of view.

21. The apparatus of claim 20 wherein the pulsed source is an x-ray source.

* * * * *